United States Patent [19]

Kitano et al.

[11] Patent Number: 4,905,811
[45] Date of Patent: Mar. 6, 1990

[54] CLUTCH COVER ASSEMBLY

[75] Inventors: Seiichi Kitano, Shijounawate; Hiroshi Takeuchi, Higashiosaka; Masaaki Asada, Ibaraki, all of Japan

[73] Assignee: Kabushiki Kaisha Daikin Seisakusho, Osaka, Japan

[21] Appl. No.: 255,168

[22] PCT Filed: Dec. 14, 1987

[86] PCT No.: PCT/JP87/00978
§ 371 Date: Aug. 2, 1988
§ 102(e) Date: Aug. 2, 1988

[30] Foreign Application Priority Data

Dec. 29, 1986 [JP] Japan ................................ 61-312757

[51] Int. Cl.[4] ........................ F16D 13/44; F16D 13/71
[52] U.S. Cl. .................................. 192/99 A; 192/70.3; 192/89 B
[58] Field of Search .................. 192/70.3, 89 B, 99 A, 192/70.29

[56] References Cited

U.S. PATENT DOCUMENTS 2,727,612 12/1955 Thelander .................... 192/99 A
4,332,314 6/1982 Flotow .......................... 192/89 B

FOREIGN PATENT DOCUMENTS 3241248 5/1984 Fed. Rep. of Germany .... 192/89 B
51-22208 6/1976 Japan .
53-35624 8/1978 Japan .
57-79331 5/1982 Japan .
1204539 9/1970 United Kingdom .............. 192/89 B
1339000 11/1973 United Kingdom .............. 192/89 B Primary Examiner—Leslie A. Braun
Assistant Examiner—Richard M. Lorence
Attorney, Agent, or Firm—Armstrong, Nikaido, Marmelstein, Kubovcik & Murray

[57] ABSTRACT

A clutch cover assembly, in which a radially inner side spring force action point (an inside projection 44, for example) of a lever 40 is provided at a position radially inward from an outer peripheral edge 33 of a diaphragm spring 30. A radially outer side spring force action point (an outside projection 46) of the lever 40 is positioned at a distance B between a rotation center O1 of the lever 40 and the outer side spring force action point shorter than a distance A between the rotation center O1 and the inner side spring force action point. The lever 40 is adapted to multiply a spring force P of the diaghragm spring 30.

The reaction force action point of the diaphragm spring 30 is shifted to an outer peripheral part of the clutch cover 16, so that a deflection of the clutch cover 16 is reduced and a release efficiency is improved.

7 Claims, 4 Drawing Sheets

CLUTCH COVER ASSEMBLY

INDUSTRIAL USEFUL FIELD

This invention relates to a clutch cover assembly, in which a spring member for pressing a pressure plate is disposed at an outside of a clutch cover.

BACKGROUND ART

A conventional arrangement of this type of clutch is illustrated in FIG. 3 (Published Patent Application (KOKAI) No. 57-79331).

In FIG. 3, 10 is a flywheel of an engine. A clutch disc 14 is sandwiched between the flywheel 10 and a pressure plate 12. The pressure plate 12 is covered by a clutch cover 16. A spring member 18, formed into an annular disc shape, and a release operation lever 20, transmitting a spring force of the spring member 18 go the pressure plate 12, are disposed at an outside of the clutch cover 16. The lever 20 is disposed at four places, for example, in a circumferential direction of the clutch with equal distances left therebetween and is so constructed than an inner peripheral side end of the lever 20 is pressed by a release bearing 24 concentric with an input shaft 22.

However, the conventional embodiment of FIG. 3 includes a problem that the spring member 18 is supported by an inner peripheral part of the clutch cover 16. The clutch cover 16 tends to be distorted by a reaction force of the spring member 18 to cause a decrease in a displacement of a tip end of the lever 20. The ratio of displacement of the pressure plate 2 to that of the lever 20, i.e. a release efficiency is deteriorated.

Furthermore, multiplication of the spring force of the spring member 18 is limited because a lever ratio of the lever 20 is small.

Furthermore, the axial dimension of the entire clutch becomes large because the spring member 18 and the lever 20 are disposed in series in an axial direction of the clutch.

DISCLOSURE OF THE INVENTION

An object of the invention is to provide a clutch cover assembly, in which an annular disc-like spring member is disposed at an outside of a clutch cover, characterized by that a release efficiency can be improved, a lever ratio for multiplying a spring force of the spring member can be set large and an axial dimension of the assembly can be shortened.

Other features and advantages of the invention will become apparent from the description given below, taken in connection with the accompanying drawings.

STRUCTURE OF THE INVENTION (1) Technical measure

This invention provides a clutch cover assembly, in which an approximately annular disc-like spring member is disposed at an outside of a clutch cover covering a pressure plate and is adapted to press on the pressure plate; characterized by that the spring member is composed of a diaphragm spring exerting its spring force in a direction opposite to the pressure plate; the clutch cover supports an outer peripheral part of the diaphragm spring and forms a fulcrum for stopping the reaction spring force of the diaphragm spring; a lever for multiplying the spring force carried by the clutch cover around a rotation center is located at a position radially inner than a spring force transmitting part of the pressure plate, and is disposed in a radial direction; a radially inner side spring force action point of the lever is provided at a position radially inner than said fulcrum of the diaphragm spring; a radially outer side spring force action point of the lever is provided at a position to cause a distance between the rotation center of the lever and the outer side spring force action point to be shorter than a distance between said rotation center and the inner side spring force action point; and the lever is adapted to multiply the spring force of the diaphragm spring.

(2) Function

Because the reaction force of the diaphragm spring is carried by the outer peripheral part, the action point of reaction force is positioned at the outer peripheral part of the clutch cover. The deflection of the clutch cover is reduced and release efficiency is improved.

It becomes possible to set a layer ratio of the lever.

The lever is required only to transmit the spring force of the diaphragm spring to the pressure plate while multiplying the force. It becomes possible to set the lever ratio large and to shorten the axial dimension of the clutch.

BEST MODE FOR CARRYING OUT THE INVENTION (1) First embodiment

Figure 1:
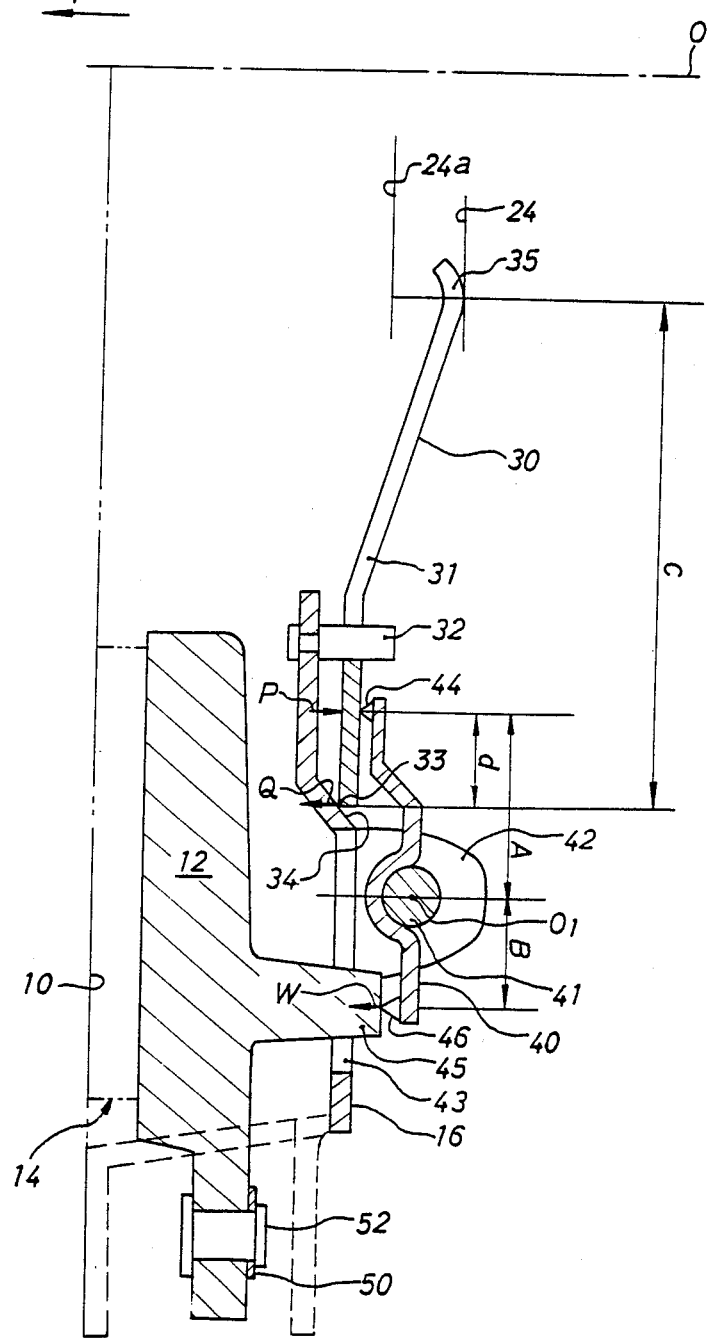
FIG. 1 is a vertical sectional partial view of a clutch of a first embodiment according to the invention.
Figure 3:
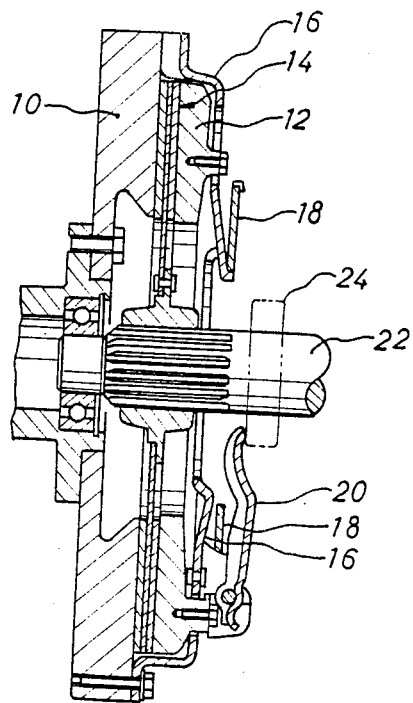
FIG. 3 is a vertical sectional view of a conventional arrangement.

In FIG. 1, which is a vertical sectional partial view of a clutch for large automobile according to the present invention, components designated with the same reference numerals as in FIG. 3 represent the same or corresponding components.

In FIG. 1, an approximately annular pressure plate 12 is concentric over the entire circumference around a center line O, and is covered by a press-formed clutch cover 16. The outer peripheral part of the clutch cover 16 is connected to a flywheel 10. The clutch cover 16 is also formed into an approximately annular shape concentric secutive over the entire circumference.

A diaphragm spring 30 is disposed at a rear side (an arrow F indicating a front side) of the flywheel 10. Pin 32 fits in a notch 31 extending radially from an inner peripheral part of the diaphragm spring 30 and locks diaphram spring 30 from rotative movement of the diaphragm spring 30. The pin 32 is secured to an inner peripheral part of the clutch cover 16. An outer peripheral edge 33 of the diaphragm spring 30 compressively contacts with the entire circumference of an inclining surface 34 of the clutch cover 16. The inclining surface 34 is adapted to stop a reaction force Q of the diaphragm spring 30. The inclining surface 34 is formed into a conical surface which inclines toward the front side as it approaches a radially inner part of the clutch cover 16 toward a radially inner side.

An inner peripheral part 35 of the diaphragm spring 30 contacts compressively with a release bearing 24 (FIG. 3). Spring force P of the diaphragm spring 30 is released by pushing the inner peripheral part 35 forward, in the direction of arrow F to a position 24a and is a wellknown structure.

A lever 40 is disposed at each of four circumferential places, for example, with equal distances left therebetween, in the circumferential direction of the clutch cover 16. Each lever 40 is carried by a shaft 41 in a freely rotatable manner. The shaft 41 extending in a direction normal to a plane of FIG. 1 and is supported by two lips 42 at its opposite ends. Namely, one end of the shaft 41 is supported by the illustrated lip 42, and the other end of the shaft 41 is supported by a second lip 42 (not illustrated).

The lip 42 is formed by cutting and raising upright a part of the clutch cover 16, having a hole 43 in the clutch cover 16. A fulcrum land 45, integral with the pressure plate 12, projects through hole 43 toward an outside of the clutch cover 16.

An inside projection 44 is formed on a radially inner peripheral part of the diaphragm spring 30, i.e. an upper part thereof in FIG. 1, and the inside projection 44 contacts compressively with the diaphragm spring 30. An outside projection 46 is formed at a bottom part of the lever 40, and the outside projection 46 contacts compressively with the fulcrum land 45 of the pressure plate 12.

The distance A between the center 01 of the shaft 41 and the inside projection 44 is set longer than a distance B between the center 01 and the outside projection 46. Thus, the lever ratio of the lever between projection 44 and the center of shaft 41 is larger than the lever ratio between center 01 of shaft 41 and outside projection 46. Accordingly, a spring force P of the diaphragm spring 30 acting on the inside projection 44 is multiplied by a lever ratio A:B for transmission from the outside projection 46 to the fulcrum land 45 as a spring force W.

Therefore, the outer peripheral edge 33 is separated from the inside projection 44 by a distance d, and an effective radius of the diaphragm spring 30 becomes c.

One end of a strap plate 50 extending in the circumferential direction of the clutch, i.e. normal to the plane, is fastened by a rivet 52 to an outer peripheral part of the pressure plate 12, and the other end of the strap plate 50 is fastened to the clutch cover 16. Consequently, under a released state where the spring force W from the inside projection 44 is removed, the pressure plate 12 is adapted to be pulled back by a spring force of the strap plate 50.

Function will be described hereinunder. Under a clutch engaged state as illustrated by FIG. 1, the reaction force Q of the diaphragm spring 30 is stopped by the inclining surface 34 of the clutch cover 16 and the spring force P is made act on the inside projection 44 of the lever 40. The spring force P is multiplied up to the spring force W by the lever ratio A:B of the lever 40 to be transmitted to the fulcrum land 45 of the pressure plate 12.

At the time of clutch released state, where the release bearing 24 is moved to the position 24a, the inner peripheral part 35 of the diaphragm spring 30 is pushed forward to prevent the spring force P of the diaphragm spring 30 from being produced, so that the diaphragm spring 30 leaves the inside projection 44. In this state, the spring force W transmitted to the fulcrum land 45 is naturally removed and a pressing force of the pressure plate 12 for pushing the clutch disc 14 toward the flywheel 10 does not function, so that the pressure plate 12 is pulled back by the spring force of the strap plate 50. Therefore, the clutch engaged state where the clutch disc 14 is sandwiched between the flywheel 10 and the pressure plate 12, is released.

Because the diaphragm spring 30 is disposed at the outside of the clutch cover 16, the diaphragm spring 30 is cooled by an outside air of comparatively low temperature and thermal influence is overcome.

The outer peripheral edge 33 of the diaphragm spring 30 is supported by the inclining surface 34 so that the fulcrum of the diaphragm spring 30 is shifted toward the radial outside of the clutch cover 16 as compared with FIG. 3 wherein the reaction force Q is supported by the most inner peripheral edge of the clutch cover 16. Therefore, the deflection is reduced, which is produced by the reaction force Q of the pressure plate 12 secured to the flywheel 10 at its outer peripheral part. Consequently, the forward displacement of the inside projection 44 at the time of releasing clutch is increased to provide a better so-called clutch disengagement efficiency (release efficiency) as compared with the conventional arrangement.

The lever 40 is not swung directly by the release bearing 24 as in the conventional arrangement but it is required only to transmit the spring force of the diaphragm spring 30 to the fulcrum land so that the lever ratio A:B can be set large. Accordingly, the large effective spring force W can be produced from the small force P. Further, a releasing load of the release bearing 24, i.e. the depression force of a clutch pedal, is small.

Because axial thickness of the lever 40 is small and the outer peripheral edge 33 of the diaphragm spring 30 compressively contacts with the forwardly slanting inclining surface 34 of the clutch cover 16, the axial dimension of the entire clutch is small and a compact design of clutch is accomplished.

(2) Second embodiment

Figure 2:
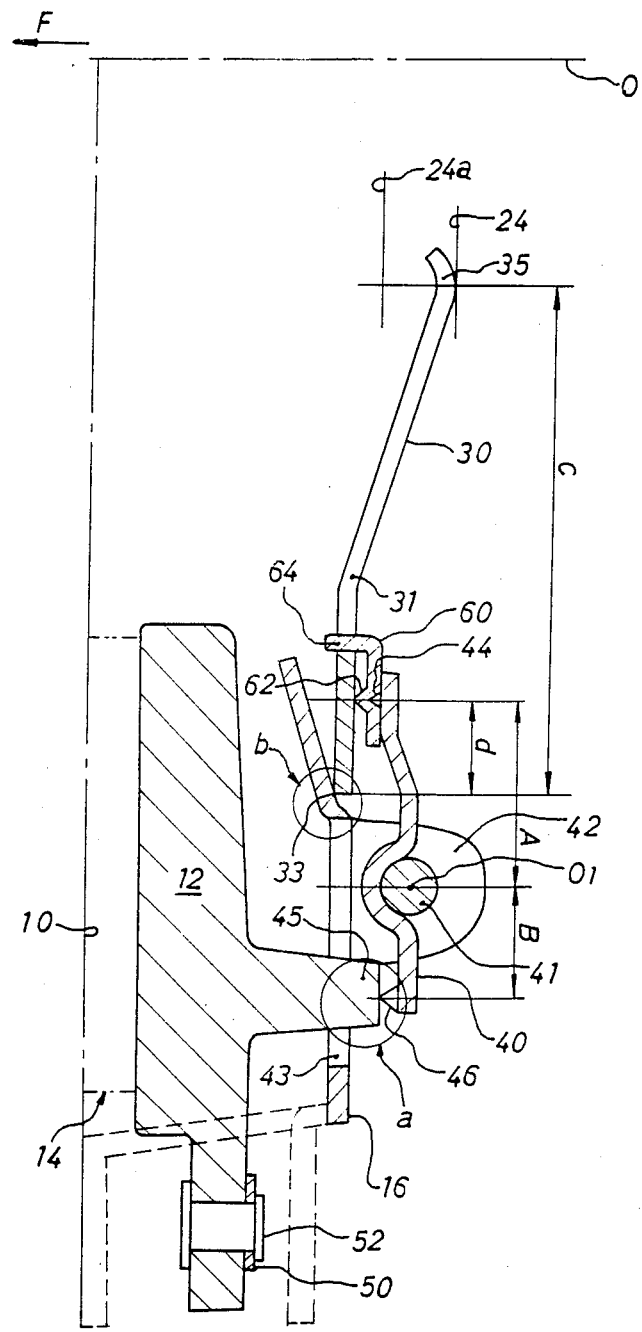
FIG. 2 is a vertial sectional partial view of a second embodiment.

In FIG. 2 showing a second embodiment of the automobile clutch according to the present invention, the diaphragm spring 30 is locked its rotative movement by a bracket 60. The bracket 60 is an annular member concentric over the entire circumference of clutch and has an annular projection 62 compressively contacting with the diaphragm spring 30 and a claw 64 projecting at a position corresponding to the notch 31.

Figure 2B:
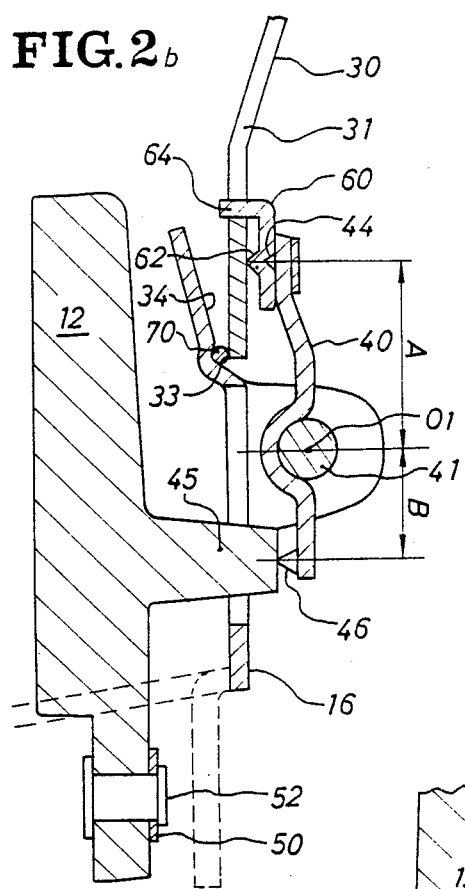
FIG. 2b is an enlarged view of the part in the circle "b" FIG. 2.
Figure 2A:
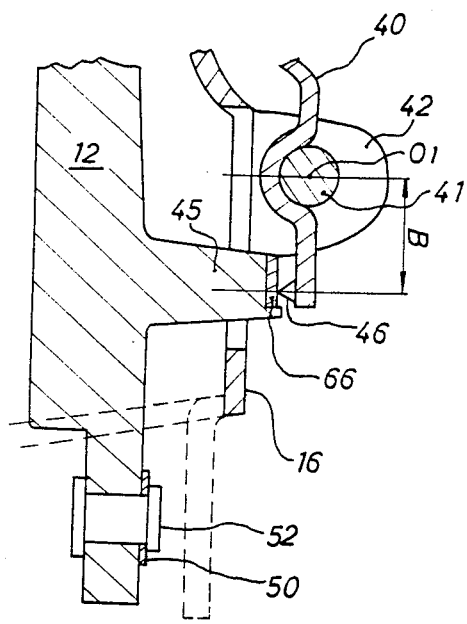
FIG. 2a is an enlarged view of the part in the circle "a" FIG. 2.

Further, as illustrated in enlarged view FIG. 2a, a spacer 66 may be installed on an end face of the fulcrum land 45 with which the outside projection 46 of the lever 40 contacts, so that a height of the outside projection 46 may be adjusted by a thickness of the spacer 66.

Furthermore, as illustrated in enlarged FIG. 2b, a ring 70 concentric over the entire circumference of clutch may be interposed between the outer peripheral edge 33 of the diaphragm spring 30 and the inclining surface 34.

EFFECT OF THE INVENTION

As described above, in the clutch cover assembly according to the present invention; the spring member is composed of the diaphragm spring 30 exerting its spring force P in a direction opposite to the pressure plate; the clutch cover supports the outer peripheral part of the diaphragm spring 30 to form the fulcrum (the outer peripheral edge 33, for example) for stopping the reaction spring force Q of the diaphragm spring 30; the lever 40 for multiplying the spring force carried by the clutch cover 16 around the rotation center located at the position radially inner than the spring force transmitting part (the fulcrum land 45, for example) of the pressure plate 12, is disposed in the radial direction; the radially inner side spring force action point (the inside projection 44, for example) of the lever 40 is provided at a position radially inner than said outer peripheral edge 33 of the diaphragm spring 30; the radially outer side spring force action point (the outside projection 46) of the lever 40 is provided at the position to cause the distance B between the rotation center 01 of the lever 40 and the outer side spring force action point to be shorter than the distance A between said rotation center 01 and the inner side spring force action point; and the lever 40 multiplies the spring force P of the diaphragm spring 30. Accordingly, the following effects become obtainable.

Because the diaphragm spring 30 is disposed at the outside of the clutch cover 16, the diaphragm spring 30 is cooled by the outside air of comparatively low temperature and hard to undergo the thermal influence so that a service life of the diaphragm spring can be prolonged.

The outer peripheral edge 33 of the diaphragm spring 30 is supported by the inclining surface 34 so that the fulcrum for the diaphragm spring 30 is shifted toward the radial outside of the clutch cover 16 as compared with FIG. 3 wherein the reaction force Q is supported by the most inner peripheral edge of the clutch cover 16. Therefore, the deflection is reduced, which is produced by the reaction force Q of the pressure plate 12 secured to the flywheel 10 at its outer peripheral part. Consequently, the forward displacement of the inside projection 44 at the time of releasing clutch is increased to provide a better so-called clutch disengagement efficiency (release efficiency) as compared with the conventional case.

The lever 40 is not swung directly by the release bearing 24 as in the conventional embodiment, but it is required only to transmit the spring force of the diaphragm spring 30 to the fulcrum land 45 so that the lever ratio A:B can be set large. Accordingly, the large spring force W can be produced from the small spring force P. Further, the releasing load of the release bearing 24, i.e. the treading force of the clutch pedal can be minimized.

Since the axial thickness of the lever 40 becomes small and the outer peripheral edge 33 of the diaphragm spring 30 compressively contacts with the forwardly slanting inclining surface 34 of the clutch cover 16, the axial dimension of the entire clutch becomes small and a compact design of the clutch is accomplished.

What is claimed is:

1. A clutch cover assembly having an approximately annular disc-like spring member disposed at an outside of a clutch cover covering a pressure plate; characterized by that the spring member is a diaphragm spring for exerting spring force on said pressure plate; said clutch cover supporting an outer peripheral part of said diaphragm spring and forming a fulcrum for said diaphragm spring; a lever pivotally mounted on said clutch cover about a rotation center located at a position radially inward from a spring force transmitting part of said pressure plate; a radially inner side spring force action point on said lever contacting said diaphgram spring at a position radially inward from said fulcrum of said diaphragm spring; a radially outer side spring force action point on said lever contacting said spring force transmitting part of said pressure plate; a distance between the rotation center of the lever and the outer side spring force action point being shorter than a distance between said rotation center and the inner side spring force action point; said lever multiplying the spring force of said diaphragm spring and applying said multiplied spring force to said pressure plate.

2. A clutch cover assembly as set forth in claim 1, in which an outer peripheral edge of said diaphragm spring compressively contacts an inclining surface of a radially intermediate part of said clutch cover, and said inclining surface is formed into a conical surface which inclines toward a radially inner part of said clutch cover.

3. A clutch cover assembly as set forth in claim 1, in which said diaphragm spring has a notch extending radially from an inner peripheral part of said diaphragm spring, and a pin fitted in an inner peripheral part of said clutch cover is fitted into said notch.

4. A clutch cover assembly as set forth in claim 1, in which said diaphragm spring is locked from rotatable movement relative to said cover by a claw of an annular bracket secured to a radially inner peripheral side end of said lever, and a projection compressively contacting with said diaphragm spring concentrically over the entire circumference of said clutch cover is formed on said bracket.

5. A clutch cover assembly as set forth in claim 1, in which a spacer is interposed between an outside projection of said lever and said spring force transmitting part of said pressure plate.

6. A clutch cover assembly as set forth in claim 1, in which a ring concentric over the entire circumference of said clutch cover is interposed between an outer peripheral edge of said diaphragm spring and said clutch cover.

7. A clutch cover assembly having an approximately annular disc-like spring member disposed at an outside of a clutch cover (16) covering a pressure plate (12); characterized by that said spring member is a diaphragm spring (30) for applying a spring force to said pressure plate (12); the clutch cover (16) supporting an outer peripheral part of said diaphragm spring (30) and forming a fulcrum (33) for said diaphragm spring (30); a lever (40) for multiplying the spring force of said diaphragm spring applied to said pressure plate and pivotally mounted on the clutch cover (16) around a rotation center (01) located at a position radially inward from a spring force transmitting part (45) of said pressure plate (12); a radially inner side spring force action point (44) on said lever (40) contacting said diaphragm spring at a position radially inward from said fulcrum (33) of said diaphragm spring (30); a radially outer side spring force action point (44) of said lever (40) contacting said spring force transmitting part of said pressure plate; a distance (B) between said rotation center (01) of said lever (40) and said outer side spring force action point (46) being less than a distance (A) between said rotation center (01) and said inner side spring force action point (44); an outer peripheral edge of said diaphragm spring (30) being in compressive contact with an inclining surface (34) of a radially intermediate part of said clutch cover (16); said inclining surface (34) being formed into a conical surface which inclines toward a radially inner part of said clutch cover; said diaphragm spring (30) having a notch (31) extending radially from an inner peripheral part of said diaphragm spring; a pin (32) fitted in an inner peripheral part of the clutch cover extending through said notch; a shaft (41) for carrying said lever (40); said shaft (41) being supported by lips (42) formed by raised upright parts of said clutch cover (16); and said spring force transmitting part (45) of pressure plate (12) passing through hole (43) in said clutch cover (16) formed by said lips (42).

* * * * *